US008229659B2

(12) United States Patent
Judd et al.

(10) Patent No.: US 8,229,659 B2
(45) **Date of Patent: *Jul. 24, 2012**

(54) METHOD AND SYSTEM TO AUTOMATICALLY GENERATE A CLEARANCE REQUEST TO DEVIATE FROM A FLIGHT PLAN

(75) Inventors: Thomas D. Judd, Woodinville, WA (US); Ruy C. P. Brandao, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/151,852

(22) Filed: Jun. 2, 2011

(65) Prior Publication Data

US 2011/0257874 A1 Oct. 20, 2011

Related U.S. Application Data

(63) Continuation of application No. 11/621,653, filed on Jan. 10, 2007, now Pat. No. 7,979,199.

(51) Int. Cl.
*G01C 21/00* (2006.01)

(52) U.S. Cl. .............. 701/120; 701/2; 701/14; 701/400; 701/410; 701/411; 701/416; 701/419; 701/443

(58) Field of Classification Search ........................ None
See application file for complete search history.

(56) References Cited

U.S. PATENT DOCUMENTS 3,646,555 A 2/1972 Atlas
3,668,403 A 6/1972 Meilander
3,750,166 A 7/1973 Dearth
4,649,388 A 3/1987 Atlas
4,706,198 A * 11/1987 Thurman ...................... 701/120
4,812,990 A 3/1989 Adams et al.

(Continued)

FOREIGN PATENT DOCUMENTS

DE 202006005089 6/2006

(Continued)

OTHER PUBLICATIONS

Dickinson, Gary W., “Feasibility Study of ATN Baseline 1 Avionics Use for U.S. Oceanic Air Traffice Control Operations”, “Digital Avionics Systems Conferences 2000”, Oct. 7, 2000, pp. 7.E.5_1-7. E.5_7, vol. 2, Publisher: IEEE, Published in: Piscataway, NJ, USA.

(Continued)

*Primary Examiner* — Jonathan M Dager
(74) *Attorney, Agent, or Firm* — Fogg & Powers LLC

(57) ABSTRACT

A method to generate a clearance request to deviate from a flight plan is provided. The method includes receiving at one or more processors in an airborne vehicle input from at least one automatic flight-plan-relevant source, at least one of the one or more processors independently determining a revised flight route based on the received input, at least one of the one or more processors independently generating a preconfigured clearance request message to deviate from the flight plan for a flight crew user based on the determining. The method further includes providing an audible prompt to the flight crew user for one of approval and rejection of the clearance request to deviate from the flight plan. When an approval of the clearance request to deviate from the flight plan is received from the flight crew user, the preconfigured clearance request message is downlinked.

20 Claims, 8 Drawing Sheets

U.S. PATENT DOCUMENTS

| | | | | |
|---|---|---|---|---|
| 5,025,382 | A * | 6/1991 | Artz | 701/120 |
| 5,086,396 | A | 2/1992 | Waruszewski, Jr. | |
| 5,153,836 | A * | 10/1992 | Fraughton et al. | 701/301 |
| 5,526,265 | A * | 6/1996 | Nakhla | 701/16 |
| 5,550,742 | A | 8/1996 | Furuya et al. | |
| 5,572,428 | A | 11/1996 | Ishida | |
| 5,615,118 | A | 3/1997 | Frank | |
| 5,631,640 | A * | 5/1997 | Deis et al. | 340/961 |
| 5,648,905 | A | 7/1997 | Izumi | |
| 5,714,948 | A * | 2/1998 | Farmakis et al. | 340/961 |
| 5,754,099 | A | 5/1998 | Nishimura | |
| 5,842,142 | A * | 11/1998 | Murray et al. | 701/16 |
| 5,884,223 | A | 3/1999 | Tognazzini | |
| 5,899,954 | A | 5/1999 | Sato | |
| 5,936,552 | A | 8/1999 | Wichgers et al. | |
| 5,941,793 | A | 8/1999 | Ito | |
| 5,999,882 | A | 12/1999 | Simpson et al. | |
| 6,043,756 | A * | 3/2000 | Bateman et al. | 340/945 |
| 6,061,627 | A | 5/2000 | Sato | |
| 6,097,996 | A * | 8/2000 | Deker | 701/10 |
| 6,141,617 | A | 10/2000 | Matsuda | |
| 6,160,497 | A * | 12/2000 | Clark | 340/961 |
| 6,198,426 | B1 | 3/2001 | Tamatsu | |
| 6,289,277 | B1 * | 9/2001 | Feyereisen et al. | 701/528 |
| 6,314,362 | B1 * | 11/2001 | Erzberger et al. | 701/120 |
| 6,567,727 | B2 * | 5/2003 | Westphal | 701/4 |
| 6,571,166 | B1 * | 5/2003 | Johnson et al. | 701/120 |
| 6,604,044 | B1 * | 8/2003 | Kirk | 701/120 |
| 6,683,541 | B2 * | 1/2004 | Staggs et al. | 340/961 |
| 6,744,382 | B1 * | 6/2004 | Lapis et al. | 340/971 |
| 6,828,921 | B2 * | 12/2004 | Brown et al. | 340/945 |
| 6,828,922 | B1 * | 12/2004 | Gremmert et al. | 340/949 |
| 6,853,906 | B1 | 2/2005 | Michi et al. | |
| 6,961,661 | B2 | 11/2005 | Sekiguchi | |
| 7,046,822 | B1 | 5/2006 | Knoeppel | |
| 7,103,455 | B2 * | 9/2006 | Subelet | 701/3 |
| 7,129,857 | B1 * | 10/2006 | Spirkovska | 340/971 |
| 7,243,026 | B2 | 7/2007 | Kudo | |
| 7,272,482 | B2 | 9/2007 | Kubota | |
| 2001/0014846 | A1 | 8/2001 | Sawamoto | |
| 2001/0018641 | A1 | 8/2001 | Kodaka | |
| 2002/0133285 | A1 | 9/2002 | Hirasago | |
| 2003/0122701 | A1 * | 7/2003 | Tran | 342/29 |
| 2003/0158666 | A1 | 8/2003 | Koike | |
| 2003/0204298 | A1 | 10/2003 | Ahmed-Zaid | |
| 2003/0210807 | A1 | 11/2003 | Sato | |
| 2004/0143393 | A1 * | 7/2004 | Knecht et al. | 701/301 |
| 2004/0158377 | A1 | 8/2004 | Matsumoto | |
| 2004/0193347 | A1 | 9/2004 | Harumoto | |
| 2004/0254729 | A1 | 12/2004 | Browne | |
| 2005/0004762 | A1 | 1/2005 | Takahama | |
| 2005/0049762 | A1 * | 3/2005 | Dwyer | 701/3 |
| 2005/0080565 | A1 | 4/2005 | Olney | |
| 2005/0203675 | A1 * | 9/2005 | Griffin et al. | 701/3 |
| 2006/0212180 | A1 * | 9/2006 | Saffre | 701/3 |
| 2006/0267748 | A1 | 11/2006 | Knoop | |
| 2007/0129854 | A1 * | 6/2007 | Sandell et al. | 701/3 |
| 2007/0129855 | A1 * | 6/2007 | Coulmeau | 701/3 |
| 2007/0142981 | A1 * | 6/2007 | Gutierrez-Castaneda et al. | 701/3 |
| 2007/0189328 | A1 * | 8/2007 | Judd | 370/466 |
| 2008/0010005 | A1 * | 1/2008 | Small et al. | 701/120 |
| 2009/0179114 | A1 * | 7/2009 | Conner | 244/189 |

FOREIGN PATENT DOCUMENTS

| | | |
|---|---|---|
| EP | 0237714 | 9/1987 |
| WO | 9519547 | 7/1995 |
| WO | 02099769 | 12/2002 |

OTHER PUBLICATIONS

European Patent Office, "Office Action", Apr. 8, 2011, Published in: EP.

Fan et al., "Study of In-Flight Replanning Decision Aids", "Proceedings of AIAA Guidance, Navigation and Control Conference", 1998, pp. 980-988, Publisher: American Institute of Aeronautics and Astronautics, Inc., Published in: Boston, MA.

Yueh-Shiou Wu et al., "Impact of Controller-Pilot Data Link Communications on Oceanic ATC Service", "The 21st Digital Avionics Systems Conference Proceedings", Oct. 27, 2002, pp. 1.C.1_1-1.C.1_10, vol. 1, Publisher: IEEE, Published in: New York, NY, USA.

* cited by examiner

METHOD AND SYSTEM TO AUTOMATICALLY GENERATE A CLEARANCE REQUEST TO DEVIATE FROM A FLIGHT PLAN

RELATED APPLICATION(S)

The present application is a continuation application of U.S. application Ser. No. 11/621,653 (the '653 Application), filed Jan. 10, 2007 (pending). The '653 Application is incorporated herein by reference.

BACKGROUND

The flight crews operate airplanes and other airborne vehicles according to a flight plan that is generated based on a destination, weather, terrain, and other factors. The flight crew and the air traffic controller are responsible for determining if a change in flight plan is warranted based on changes that occur during the flight. For example, a flight crew can determine a clearance deviation request needs to be made due to efficient route availability, altitudes available, weather, and potential conflicts ahead. In some cases, before or during the flight, there are changes that can be made to a flight plan, which the human operators and traffic controllers do not notice or to which they do not respond in a timely fashion.

SUMMARY

The present application relates to a method to generate a clearance request to deviate from a flight plan. The method includes receiving at one or more processors in an airborne vehicle input from at least one automatic flight-plan-relevant source, at least one of the one or more processors independently determining a revised flight route based on the received input, at least one of the one or more processors independently generating a preconfigured clearance request message to deviate from the flight plan for a flight crew user based on the determining. The method further includes providing an audible prompt to the flight crew user for one of approval and rejection of the clearance request to deviate from the flight plan. When an approval of the clearance request to deviate from the flight plan is received from the flight crew user, the preconfigured clearance request message is downlinked.

DRAWINGS

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Figure 1:
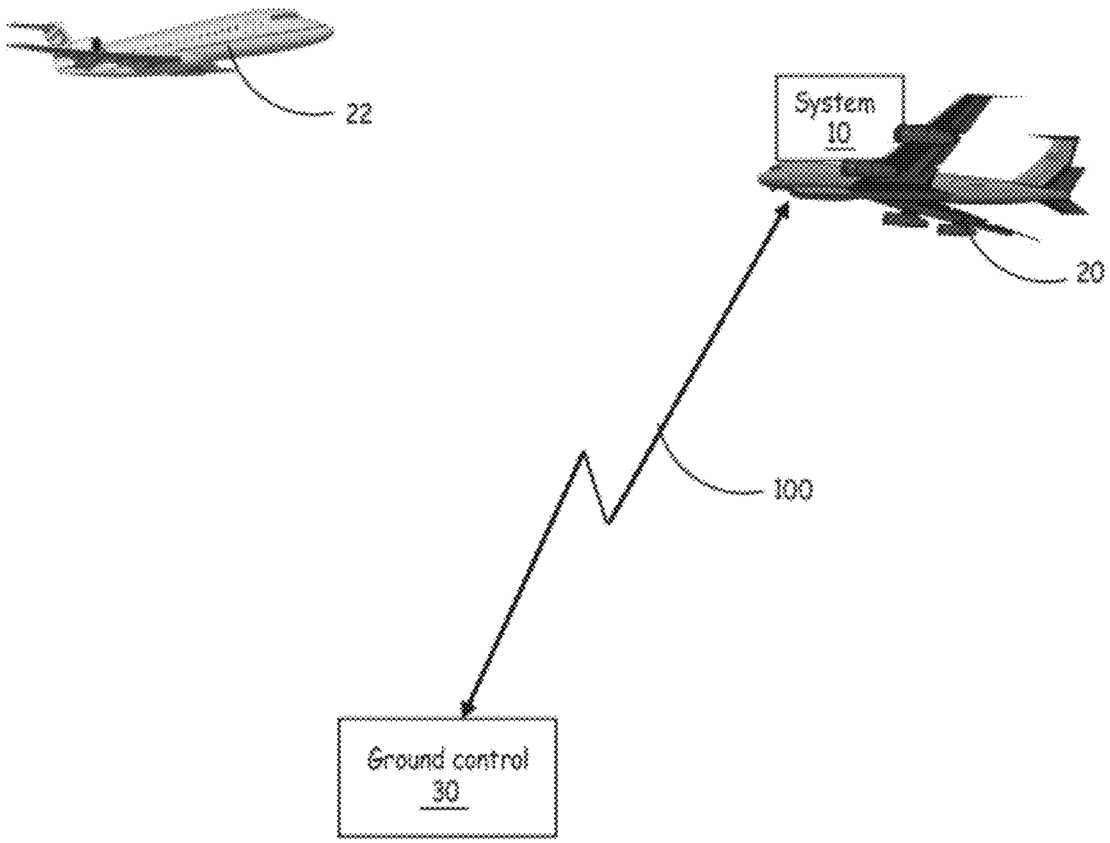
FIG. 1 is an illustration of implementation of one embodiment of a system to generate a clearance request to deviate from a flight plan.

FIG. 1 is an illustration of implementation of one embodiment of a system 10 to generate a clearance request to deviate from a flight plan. System 10 is located within or on an airplane 20. In one implementation of this embodiment, the airplane 20 is any airborne vehicle, such as a jet or a helicopter. System 10 generates a clearance request to deviate from a flight plan as necessary. In this exemplary implementation, airplane 20 is on a path that passes close to airplane 22. System 10 in the airplane 20 receives input from at least one flight-plan-relevant source, such as a traffic-alert and collision avoidance system (TCAS), and determines an improved flight route based on the received input. System 10 automatically creates a datalink clearance request to prompt the flight crew to review the potential clearance request. The pilot reviews the preconfigured clearance request message and decides whether or not to send it to the air traffic controller at the ground control 30. Thus, the pilot does not need to detect a need for flight path revision and create a request.

If the flight crew approves the datalink clearance request, the preconfigured clearance request message (shown as signal 100) it is downlinked from the airplane 20 to the ground control 30. If the air traffic controller in the ground control 30 allows the change in the flight plan, an uplink of a confirmation of the preconfigured clearance request message (shown as signal 100) is sent via an air-to-ground wireless network from the ground control 30 to system 10 in the airplane 20. If the air traffic controller in the ground control 30 rejects the change in the flight plan, an uplink of the rejection of the preconfigured clearance request message (shown as signal 100) is sent from the ground control 30 to system 10 in the airplane 20.

In this manner, system 10 receives input related to conditions of a flight plan, generates a preconfigured clearance request message and receives two approvals to the generated preconfigured clearance request message. During the first approval, the system 10 indicates the preconfigured clearance request message to a user and receives onboard approval input of the preconfigured clearance request message. During the second approval, the system 10 downlinks the preconfigured clearance request message to an air traffic controller in the ground control 30. If the air traffic controller approves the preconfigured clearance request message, an offboard approval input is uplinked to system 10.

If the system receives an onboard rejection input, the preconfigured clearance request is not downlinked to the ground control 30. Likewise, if the controller rejects the preconfigured clearance request message, an offboard rejection input is uplinked to system 10 and the current flight path is maintained by the airplane 10. Implementation of system 10 allows the flight crew to take advantage of the flight path deviation sooner and reduces the flight crew's "heads-down" time/effort in having to create the clearance.

System 10 uses flight management computer (FMC), weather radar, TCAS, etc., to monitor for conditions that would warrant a deviation from the flight plan (e.g., altitude, speed, or heading clearance request). The conditions that can trigger this clearance request review could be things like weather issues, more efficient routes determined, potential conflicts, etc. The term "flight management computer" as used herein refers to a device or unit that performs the flight management function.

Figure 2:
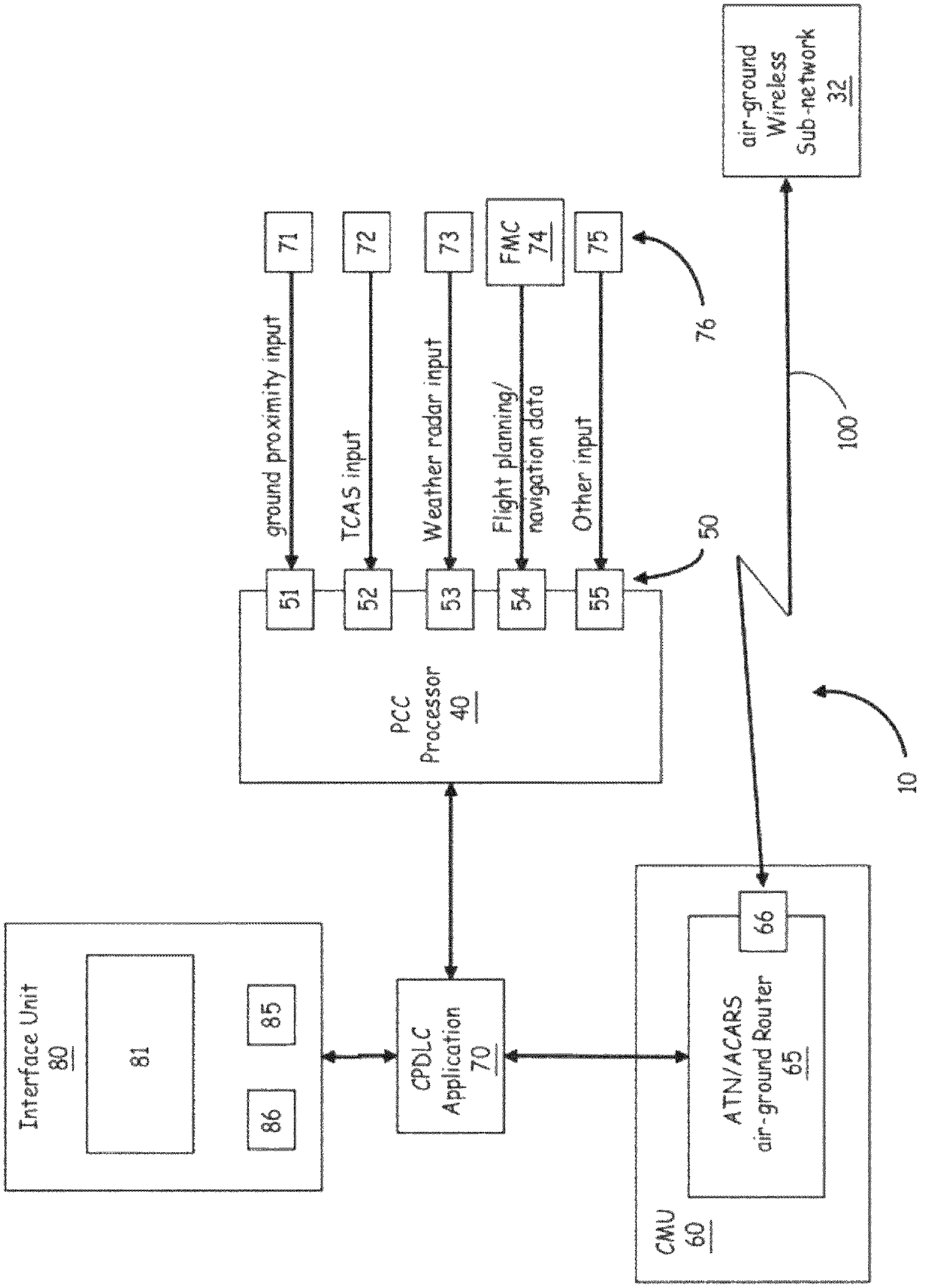
FIG. 2 is a block diagram of one embodiment of a system to generate a clearance request to deviate from a flight plan.

FIG. 2 is a block diagram of one embodiment of a system 10 to generate a clearance request to deviate from a flight plan. System 10 includes a processor 40, a controller/pilot data link communications (CPDLC) application 70, a communications management unit (CMU) 60, an interface unit 80, and at least one interface represented generally by the numeral 50. The interfaces 50 communicatively couple the processor 40 to at least one flight-plan-relevant source represented generally by the numeral 76. As used herein, the term "communications management unit" refers to a device or unit that manages the communications between the airplane 20 and the ground control 30.

In one implementation of this embodiment, the processor is a predictive controller/pilot data link communication (CPDLC) clearance processor. The terms "processor 40" and "predictive CPDLC clearance (PCC) processor 40" are used interchangeably herein. In one implementation of this embodiment, the PCC processor 40 is integrated with one or more other processors within the airplane 20 (FIG. 1). The PCC processor 40 processes the inputs to determine that a clearance should be created, then it inputs the clearance request to the CPDLC application 70. The CPDLC application 70 presents a PCCP message, i.e., pre-formatted clearance request, at the interface unit 80 for the pilot to accept or reject.

As shown in FIG. 2, the interface unit 80 includes a screen 81 on which to visually indicate the prompt to the user, such as the pilot of the airplane 20. The visual indication can be a text message, a flag, or an icon indicative of a clearance request to deviate from a flight plan. In an exemplary visual indication, a text message "Clearance request ready for review," is displayed on the screen 81. The interface unit 80 also includes a user input interface 85 and an audio alert generator 86 to audibly alert the user that a prompt is visually indicated on the display 81. In one implementation of this embodiment, the interface unit 80 is a human-machine interface. The user input interface 85 receives approval input or rejection input from the user in response to the visual prompt to the user. In yet another implementation of this embodiment, there is no audio alert generator 86 in the interface unit 80. In one embodiment of such an implementation, the interface unit 80 includes a visual alert (not shown), such as a light emitting diode on the windshield of the cockpit to alert the pilot that a prompt is visually indicated on the display 81.

In one implementation of this embodiment, the user input interface is a tactile input interface 85 such as one or more push buttons or a joy stick. For example, the tactile input interface 85 may include a push button labeled "YES" and another push button labeled "N)." In this case, when the pilot pushes the "YES" button, the interface unit 80 recognizes an approval input. In another implementation of this embodiment, the user input interface 85 is audio input interface such as a microphone/receiver to receive verbal input. For example, the user states "ACCEPT PROPOSED FLIGHT PLAN," and the interface unit 80 recognizes that statement as an approval input. In yet another implementation of this embodiment, the user input interface 85 is both tactile and audio. For example, the user pushes a button and within three seconds announces "ACCEPT PROPOSED FLIGHT PLAN." In yet another implementation of this embodiment, the user input interface is a multi-purpose control and display unit (MCDU) human/machine interface device or a multi-function display (MFD).

The interface unit 80 is communicatively coupled to send information indicative of approval input or rejection input to the CPDLC application 70. The CPDLC application 70 controls the communications between the flight crew (e.g., pilot) and ground control 30 (FIG. 1). There are at least two types of CPDLC applications 70 currently in use. One type of CPDLC application 40 is a future air navigation system (FANS) version designed to go over an aircraft communications addressing and reporting system (ACARS). The second type of CPDLC application 40 is designed to go over an aeronautical telecommunications network (ATN). The CPDLC application 40 can reside in either a flight management computer 74 or the communications management unit 60 as is shown in various embodiments in FIGS. 5-8. Once the clearance request is downlinked to the ground control 30 (FIG. 1) the CPDLC application runs as normal. Eventually, the ground control 30 responds to the clearance request (e.g., grants or denies the clearance). In another implementation of this embodiment, the CPCLC application 40 resides in another device, such as an air traffic service unit (ATSU). In yet another implementation of this embodiment, the flight management computer 74 or the communications management unit 60 are in integrated boxes that include a communication management function and/or flight management function.

The ATN and ACARS are subnetworks, such as an air-to-ground wireless sub-network 32, that provide access for uplinks (going to the aircraft from the ground) and downlinks (going from the aircraft to the ground).

The communications management unit 60 is communicatively coupled to the CPDLC application 40 to receive information indicative of the clearance request after the clearance request to deviate from a flight plan is approved by the user. The communications management unit 60 includes some datalink (air-to-ground data communications) applications, but its primary function is that of router for datalinking between the airplane 20 (FIG. 1) and the ground control 30 (FIG. 1) via ACARS or ATN networks. As shown in FIG. 2, the communications management unit 60 includes a router 65, also referred to herein as ATN/ACARS air-to-ground router 65. The router 65 includes a wireless interface 66 to communicatively couple the router 65 to an air-to-ground wireless sub-network 32. The signals indicative of the clearance request to deviate from a flight plan are sent from the wireless interface 66 to the ground control 30 via the air-to-ground wireless sub-network 32.

Various flight-plan-relevant sources 76 provide input to the processor 40 via the interfaces 50. For example in one implementation of this embodiment, an altimeter 71 provides ground proximity input to the PCC processor 40 via interface 51. In another implementation of this embodiment, a traffic-alert and collision avoidance system (TCAS) 72 provides TCAS input to the PCC processor 40 via interface 52. In yet another implementation of this embodiment, a weather radar system 73 provides weather radar input the PCC processor 40 via interface 53. In yet another implementation of this embodiment, a flight management computer (FMC) 74 provides flight planning data and/or navigation data to the PCC processor 40 via interface 54. In yet another implementation of this embodiment, other flight-plan-relevant sources 75 provide other input to the PCC processor 40 via interface 55.

The flight management computer 74 monitors for more efficient routes, altitudes, etc. The TCAS 72 monitors for potential traffic conflicts or traffic congestion. In one implementation of this embodiment, the FMC 74 has access to the current routes, speeds, altitudes, etc. The weather radar system 73 provides updated weather reports that may indicate an unexpected change in weather conditions in the current flight path. The processor 40 determines if a clearance request to deviate from a flight plan makes sense based on the inputs received via interfaces 50. In one implementation of this embodiment, the processor 40 presents alternative route clearance request options for more than one revised flight path if more than one alternative route is available. In such an implementation, it is desirable for the optional routes to be sufficiently different in order to warrant more than one option. For example, it is not desirable to present two alternate flight routes, which only vary in altitude by about 5% of the maximum altitude for a particular leg of the flight route.

Figure 3:
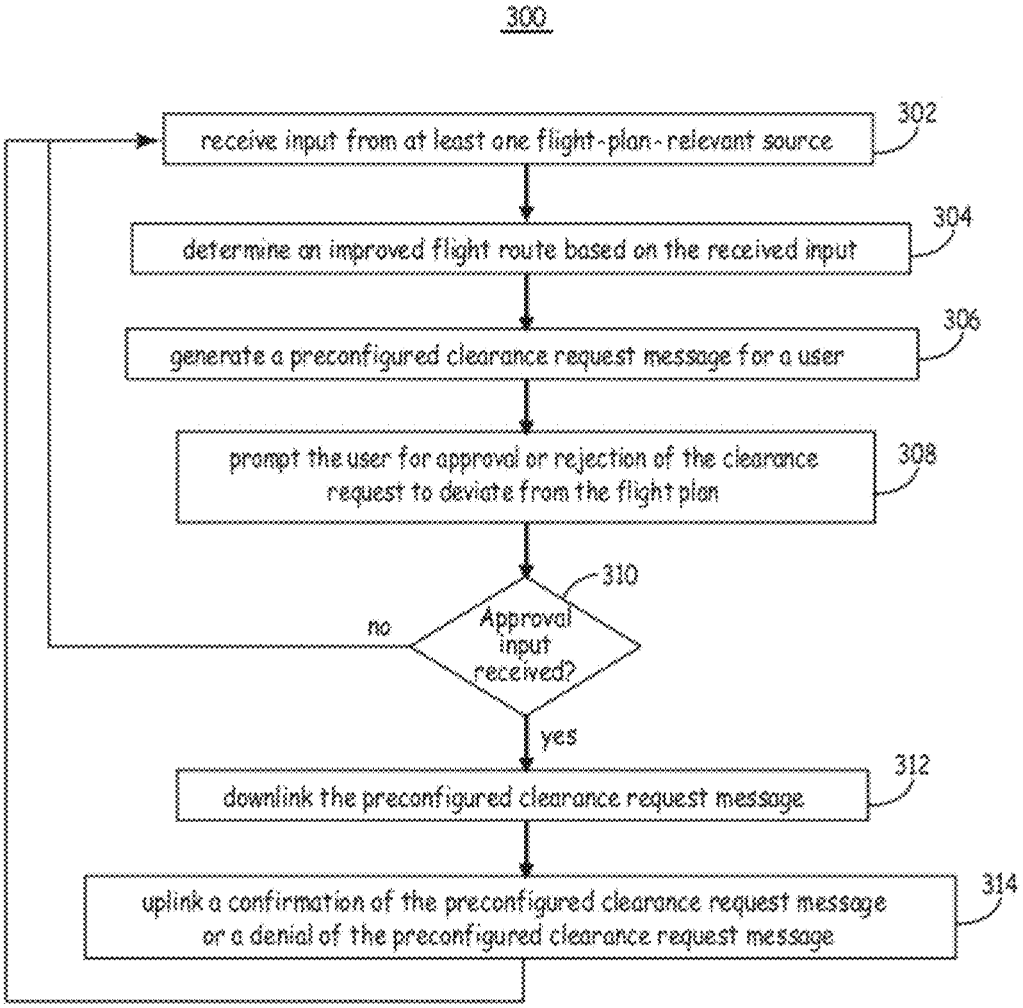
FIG. 3 is a flow diagram of one embodiment of a method to generate a clearance request to deviate from a flight plan.

FIG. 3 is a flow diagram of one embodiment of a method 300 to generate a clearance request to deviate from a flight plan. The embodiment of method 300 is described as being implemented using the system 10 of FIG. 2 to generate a clearance request to deviate from a flight plan. In such an embodiment, at least a portion of the processing of method 300 is performed by software executing on the PCC processor 40 and the CPDLC application 70.

At block 302, the PCC processor 40 receives input from at least one flight-plan-relevant source 76. The PCC processor 40 continuously or periodically receives input during the preparation for take off, during the flight, and while landing. In one implementation of this embodiment, receiving input from at least one flight-plan-relevant source comprises receiving at least one of a weather radar input, a ground proximity input, a traffic collision avoidance input, and flight data from a flight management computer (FMC). For example, the PCC processor 40 receives ground proximity input via interface 51 from an altimeter 71 and weather radar input from a radar system 73 via interface 53.

At block 304, the PCC processor 40 determines a revised flight route based on the received input. At block 306, the PCC processor 40 generates a preconfigured clearance request message to deviate from the flight plan for a user if the PCC processor 40 determines that there is better flight plan than the current flight plan. For example, if the PCC processor 40 determines, based on the ground proximity input and the weather radar input, that a previously unpredicted storm now intersects the flight path, the PCC processor 40 determines that the plane can avoid the storm clouds by flying at a higher altitude. In this case, the PCC processor 40 generates a preconfigured clearance request message to fly at a higher altitude before the airplane 20 reaches the storm clouds. The PCC processor 40 sends the preconfigured clearance request message to deviate from the flight plan to the CPDLC application 70. In one implementation of this embodiment, generating a preconfigured clearance request message for a user comprises generating a controller/pilot data link communication (CPDLC) clearance request.

At block 308, the CPDLC application 70 prompts the user for approval or rejection of the clearance request to deviate from the flight plan. In one implementation of this embodiment, the CPDLC application 70 sends a signal to the interface unit 80 so the clearance request is displayed on the screen 81 to visually indicate the prompt to the user. The user input interface 85 receives approval input or rejection input from the user in response to the visual prompt to the user. The displayed text message may be something generic, such as, "FLIGHT PLAN DEVIATION REQUESTED." The displayed text message may be something specific, such as, "REQUEST TO CHANGE FLIGHT PLAN BY ASCENDING TO 30000 FEET FROM 25000 FEET IN FIVE MINUTES AT 08:30 GMT FOR TEN MINUTES BEFORE RETURNING TO 25000 FEET."

If the user, such as the pilot or co-pilot, determines a significantly improved flight route is not available, an approval input is not received at the user input interface 85 of the interface unit 80 at block 310 and the flow proceeds back to block 302. In this case, the PCC processor 40 continues to receive input from at least one flight-plan-relevant source 76. If the user determines a significantly improved flight route is available, an approval input is received at the user input interface 85 of the interface unit 80 at block 310 and the flow proceeds to block 312.

At block 312, when an approval input for the clearance request to deviate from the flight plan is received from the user, the CPDLC application 70 downlinks the preconfigured clearance request message to the ground control 30 via the air-to-ground wireless sub-network 32. In one implementation of this embodiment, the CPDLC application 70 downlinks the preconfigured clearance request message to the ground control 30 via the communications management unit 60, the router 65, and the wireless interface 66. When a rejection input for the clearance request to deviate from the flight plan is received from the user, the CPDLC application 70 does not downlink the preconfigured clearance request message to the ground control 30 and the current flight path is maintained.

At block 314, the CPDLC application 70 uplinks either an approval or a rejection of the preconfigured clearance request message from a traffic controller. The uplink is received from the ground control 30 via the air-to-ground wireless sub-network 32. The communication is sent via the router 65 in the communications management unit 60. The flow then proceeds back to block 302 and the PCC processor 40 continues to receive input from at least one flight-plan-relevant source 76 unit the flight is completed.

FIGS. 4-8 are block diagrams of various embodiments of a system to generate a clearance request to deviate from a flight plan. Method 300 can be implemented by any one of the embodiments of FIGS. 4-8, as will be understandable to one of skill in the art, after reading this specification.

Figure 4:
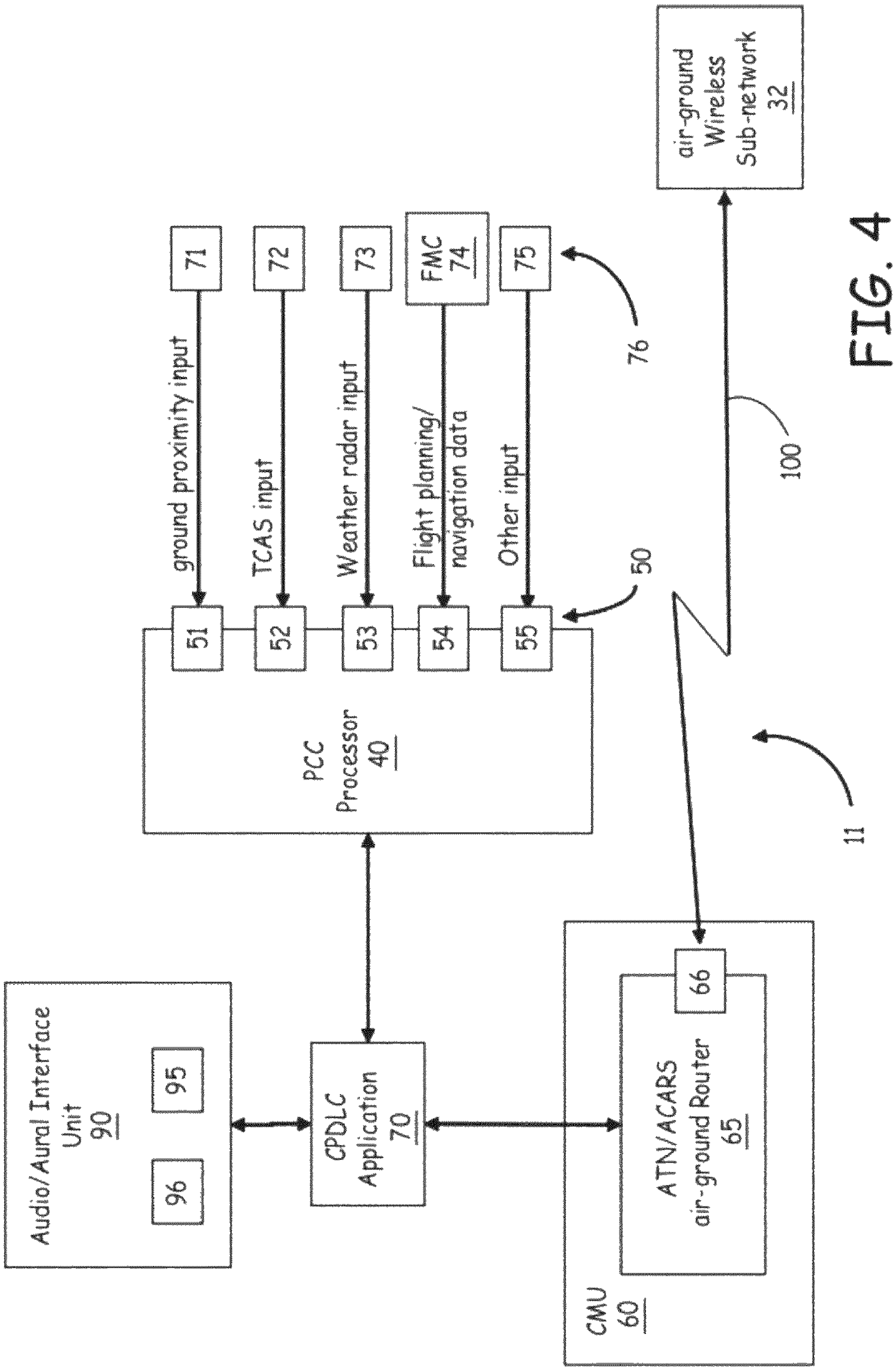
FIGS. 4-8 are block diagrams of various embodiments of a system to generate a clearance request to deviate from a flight plan.

FIG. 4 is a block diagram of one embodiment of a system 11 to generate a clearance request to deviate from a flight plan. System 11 is similar to system 10 of FIG. 2 in that system 11 includes the processor 40, the controller/pilot data link communications (CPDLC) application 70, the communications management unit (CMU) 60, and the interfaces 50 communicatively coupling the processor 40 to at least one flight-plan-relevant source 76. In system 11, the interface unit is an audio/aural interface unit 90 rather than a visual interface unit 80. The audio/aural interface unit 90 includes an audio alert generator 96 to audibly provide the prompt to the user and a user input interface 95.

For example, the audio alert generator 96 may translate signals received from the CPDLC application 70 into a string of phonemes that announce the request to deviate from a flight plan using a voice readback device or system as known in the art. The announcement may be something generic, such as, "FLIGHT PLAN DEVIATION REQUESTED." The announcement may be something specific, such as, "REQUEST TO CHANGE FLIGHT PLAN BY ASCENDING TO 30000 FEET FROM 25000 FEET IN FIVE MINUTES AT 08:30 GMT FOR TEN MINUTES BEFORE RETURNING TO 25000 FEET."

The user input interface 95 receives approval input or rejection input from the user in response to the audio or aural prompt to the user. In one implementation of this embodiment, the user input interface 95 is a tactile input interface, an audio input interface or a tactile-audio interface as described above with reference to FIG. 2. For example, the user pushes a button and within three seconds announces "ACCEPT PROPOSED FLIGHT PLAN."

In one implementation of this embodiment, the user input interface 95 is implemented to input a request to repeat the announcement of the request to deviate from the flight plan.

Figure 5:
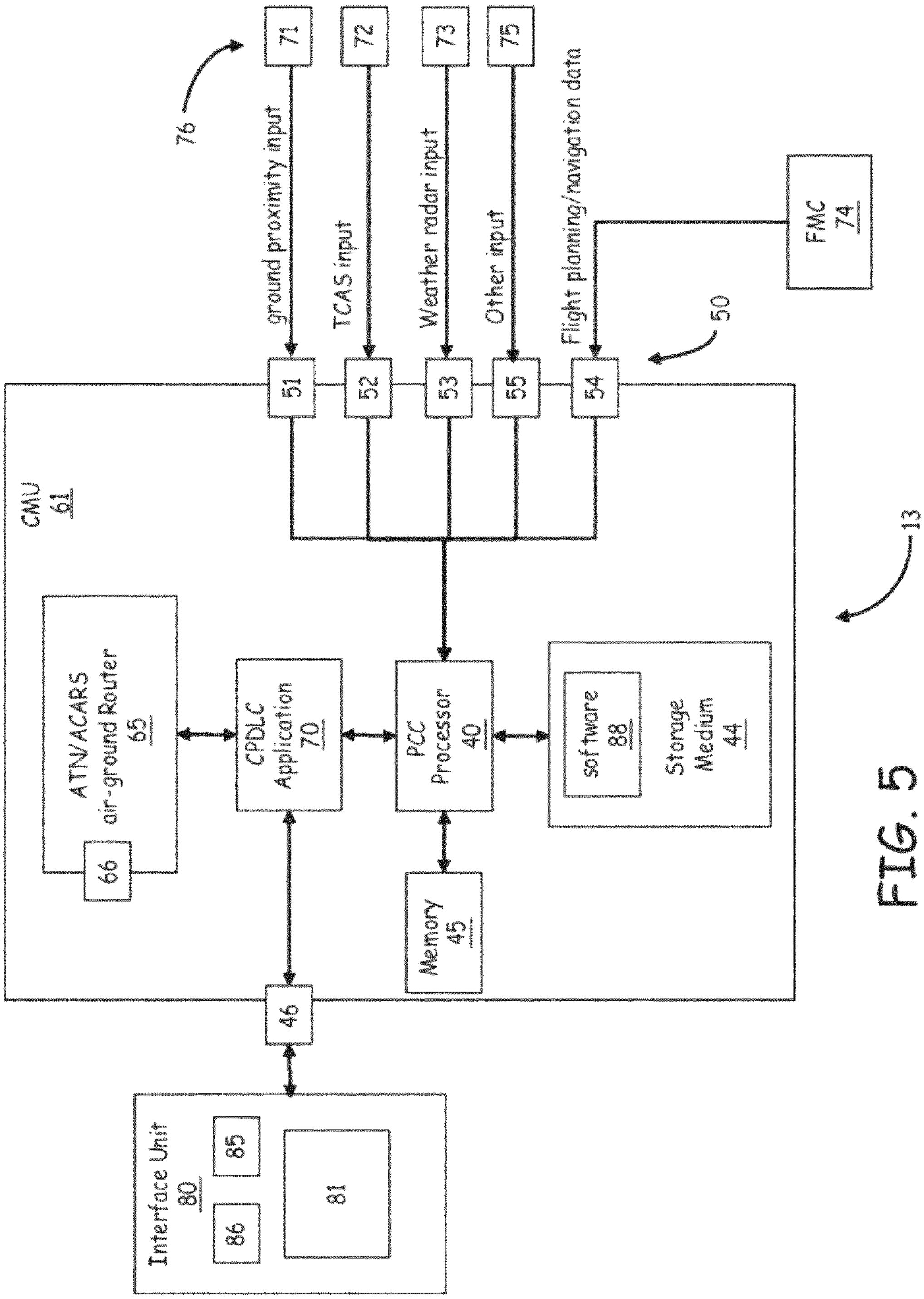

FIG. 5 is a block diagram of one embodiment of a system 13 to generate a clearance request to deviate from a flight plan. As shown in FIG. 5, the CPDLC application 70, the PCC processor 40, the router 65, a memory 45, and software 88 embedded in a storage medium 44 are in the communications management unit 61. The flight management computer 74 outputs flight planning input and/or navigation data to the PCC processor 40 via interface 54. The interface unit 80 is communicatively coupled to the CPDLC application 70 via the interface 46. In one implementation of this embodiment, system 13 includes audio/aural interface unit 90, as described above with reference to FIG. 4, in place of interface unit 80.

The CPDLC application 70 is communicatively coupled to the router 65 and the PCC processor 40. The PCC processor 40 is communicatively coupled to the memory 45, which stores a current flight plan, and the storage medium 44, which stores software 88 that is executed by the PCC processor 40. At least one interface 50 provides input from the flight-plan-relevant sources 76 to the PCC processor 40, as described above with reference to FIG. 2.

The PCC processor 40 is coupled to the memory 45, the storage medium 44, the interfaces 50, and the CPDLC application 70 via a wireless communication link (for example, a radio-frequency (RF) communication link) and/or a wired communication link (for example, an optical fiber or conductive wire communication link). The CPDLC application 70 is communicatively coupled to the interface unit 80 and the router 65 via a wireless communication link and/or a wired communication link.

The clearance request is wirelessly transmitted from the ATN/ACARS air-to-ground router 65 via the interface 66. The clearance request is in the signal 100 (FIG. 1) transmitted from system 13 to the ground control 30 (FIG. 1).

The communications management unit 61, the flight management computer 74, and the interface unit 80 are in the airplane 20 (FIG. 1). One or more of the flight-plan-relevant sources 76 can be in or on the airplane 20 and one or more of the flight-plan-relevant sources 76 can be external to the airplane 20. For example, the flight-plan-relevant source 71, which provides the ground proximity input may be an altimeter in the airplane 20 and the flight-plan-relevant source 73, which provides the weather radar input may be a ground based radar system external to the airplane 20.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

The PCC processor 40 executes software 88 and/or firmware that causes the PCC processor 40 to perform at least some of the processing described here as being performed during method 300 as described above with reference to FIG. 3. At least a portion of such software 88 and/or firmware executed by the PCC processor 40 and any related data structures are stored in storage medium 44 during execution. Memory 45 comprises any suitable memory now known or later developed such as, for example, random access memory (RAM), read only memory (ROM), and/or registers within the PCC processor 40. In one implementation, the PCC processor 40 comprises a microprocessor or microcontroller. Moreover, although the PCC processor 40 and memory 45 are shown as separate elements in FIG. 5, in one implementation, the PCC processor 40 and memory 45 are implemented in a single device (for example, a single integrated-circuit device). The software 88 and/or firmware executed by the PCC processor 40 comprises a plurality of program instructions that are stored or otherwise embodied on a storage medium 44 from which at least a portion of such program instructions are read for execution by the PCC processor 40. In one implementation, the PCC processor 40 comprises processor support chips and/or system support chips such as ASICs.

Figure 6:
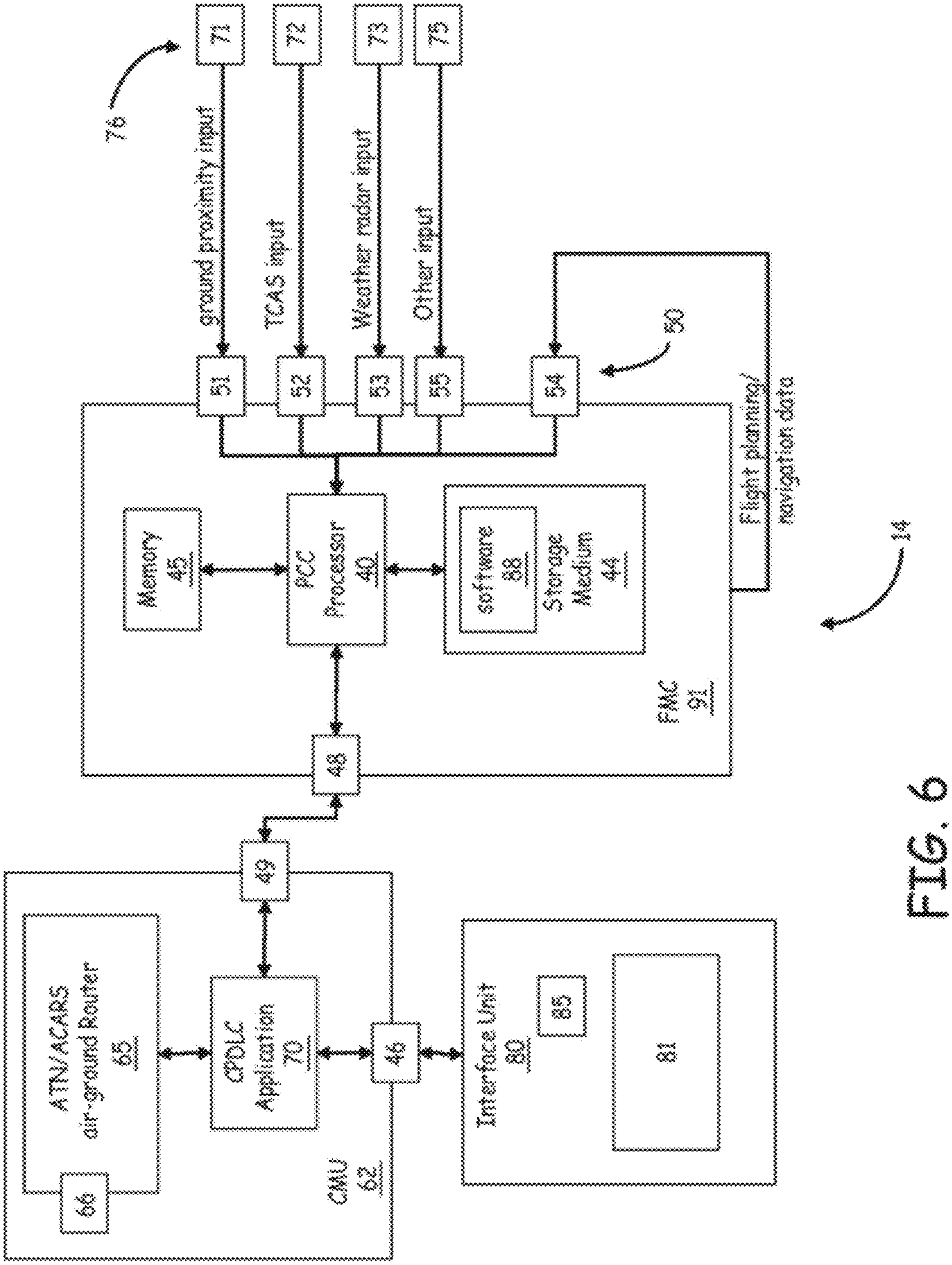

FIG. 6 is a block diagram of one embodiment of a system 14 to generate a clearance request to deviate from a flight plan. As shown in FIG. 6, the PCC processor 40, the memory 45, and software 88 embedded in a storage medium 44 are in the flight management computer 91. The CPDLC application 70 and the router 65 are in the communications management unit 62. The flight management computer 91 outputs flight planning input and/or navigation data to the PCC processor 40 via interface 54, which is internal to the flight management computer 91. In one implementation of this embodiment, the flight management computer 91 outputs flight planning input and/or navigation data to the PCC processor 40 without the interface 54. The interface unit 80 is communicatively coupled to the CPDLC application 70 in the communications management unit 62 via the interface 46. In one implementation of this embodiment, system 14 includes audio/aural interface unit 90, as described above with reference to FIG. 4, in place of interface unit 80.

The CPDLC application 70 is communicatively coupled to the router 65. The CPDLC application 70 is communicatively coupled to the PCC processor 40 via interfaces 48 and 49. The PCC processor 40 is communicatively coupled to the memory 45 and the storage medium 44, which stores software 88 that is executed by the PCC processor 40. The at least one interface 50 provides input from the flight-plan-relevant sources 76 to the PCC processor 40, as described above with reference to FIG. 2.

The PCC processor 40 is coupled to the memory 45, the storage medium 44, the interfaces 50 and 48, and the CPDLC application 70 via a wireless communication link and/or a wired communication link. The CPDLC application 70 is communicatively coupled to the interface unit 80 and the router 65 via a wireless communication link and/or a wired communication link.

The clearance request is wirelessly transmitted from the ATN/ACARS air-to-ground router 65 via the interface 66. The clearance request is in the signal 100 (FIG. 1) transmitted from system 14 to the ground control 30 (FIG. 1).

The communications management unit 62, the flight management computer 74, and the interface unit 80 are in the airplane 20 (FIG. 1). One or more of the flight-plan-relevant sources 76 can be in or on the airplane 20 and one or more of the flight-plan-relevant sources 76 can be external to the airplane 20.

Figure 7:
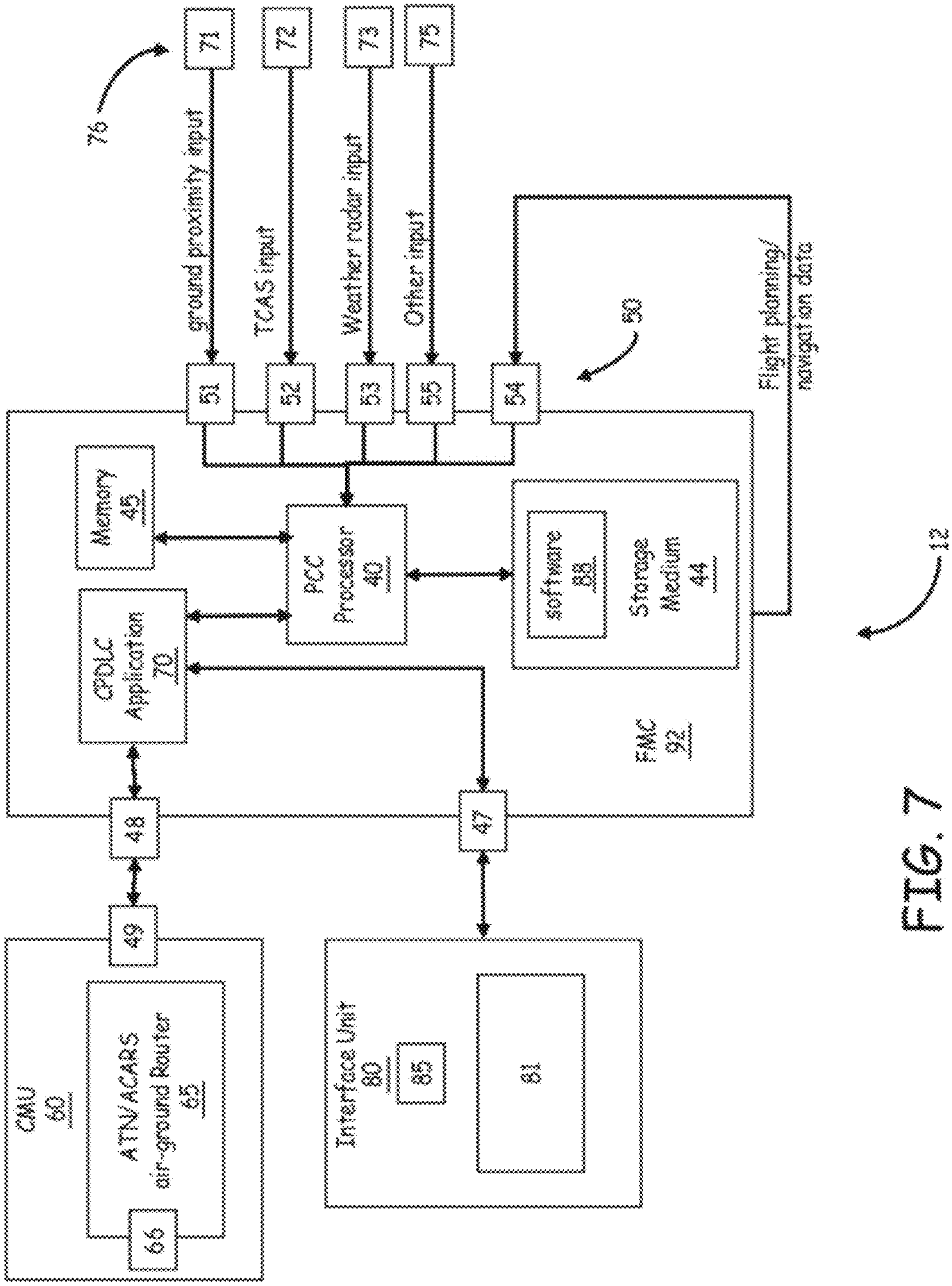

FIG. 7 is a block diagram of one embodiment of a system 12 to generate a clearance request to deviate from a flight plan. FIG. 7 is similar to FIG. 6, except the CPDLC application 70 is in the flight management computer 92 rather than in the communications management unit. As shown in FIG. 7, the CPDLC application 70, the PCC processor 40, the memory 45, and software 88 embedded in a storage medium 44 are in the flight management computer 92. The router 65 is in the communications management unit 60. The flight management computer 92 provides flight planning input and/or navigation data to the PCC processor 40 via interface 54, which is internal to the flight management computer 92. In one implementation of this embodiment, the flight management computer 92 outputs flight planning input and/or navigation data to the PCC processor 40 without the interface 54. The interface unit 80 is communicatively coupled to the CPDLC application 70 in the flight management computer 92 via the interface 47. In one implementation of this embodiment, system 12 includes audio/aural interface unit 90, as described above with reference to FIG. 4, in place of interface unit 80.

The CPDLC application 70 is communicatively coupled to the router 65 via interfaces 48 and 49. The PCC processor 40 is communicatively coupled to the CPDLC application 70, the memory 45 and the storage medium 44, which stores software 88 that is executed by the PCC processor 40. The at least one interface 50 provides input from the flight-plan-relevant sources 76 to the PCC processor 40, as described above with reference to FIG. 2.

The PCC processor 40 is coupled to the memory 45, the storage medium 44, and the CPDLC application 70 via a wireless communication link and/or a wired communication link. The CPDLC application 70 is communicatively coupled to the interfaces 48 and 47 via a wireless communication link and/or a wired communication link.

The clearance request is wirelessly transmitted from the ATN/ACARS air-to-ground router 65 via the interface 66. The clearance request is in the signal 100 (FIG. 1) transmitted from system 12 to the ground control 30 (FIG. 1).

The communications management unit 60, the flight management computer 92, and the interface unit 80 are in the airplane 20 (FIG. 1). One or more of the flight-plan-relevant sources 76 can be in or on the airplane 20 and one or more of the flight-plan-relevant sources 76 can be external to the airplane 20.

In one implementation of this embodiment, the input from the CPDLC application 70 is sent to the PCC processor 40 and the PCC processor 4 outputs the clearance request to deviate from a flight plan to the interface unit 80 via interface 47.

Figure 8:
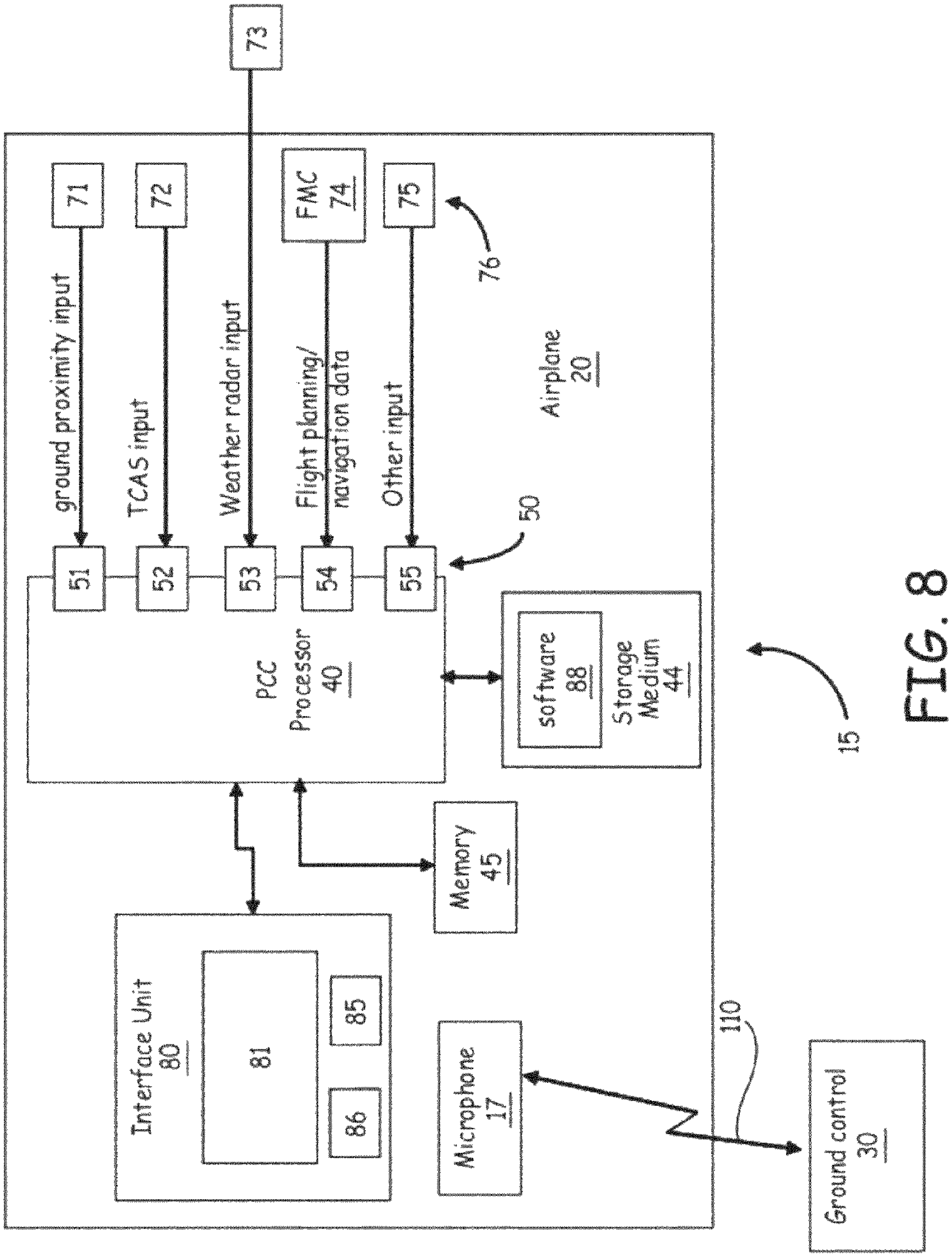

FIG. 8 is a block diagram of one embodiment of a system 15 to generate a clearance request to deviate from a flight plan. System 15 differs from systems 10-14 in that there is no CPDLC application in system 15. As shown in FIG. 8, the airplane 20 includes a PCC processor 40 having interfaces 50, memory 45, software 88 embedded in storage medium 44, interface unit 80 and a microphone 17. The PCC processor 40 operates as described above with reference to FIGS. 2 and 5. The PCC processor 40 receives input from at least one flight-plan-relevant source 77, determines a revised flight route based on the received input, and generates a preconfigured clearance request message to deviate from the flight plan. The preconfigured clearance request message is displayed on the interface unit 80 to prompt the user for approval or rejection of the clearance request. In this implementation, the user indicates approval of the clearance request to deviate from the flight plan by picking up the microphone 17 and calling in the clearance request to deviate from the flight plan to the ground control 30. In this manner, the PCC processor 40 is implemented to determine a clearance request to deviate from the flight plan is required but there is no CPDLC application to provide the communication from the airplane 20 to the ground control. The downlinking the preconfigured clearance request message includes picking up the microphone 17 and communicating by radio with ground control 30. The uplinking an approval or rejection of the preconfigured clearance request message from a traffic controller includes receiving a verbal OK from the traffic controller in the ground control 30 after the traffic controller reviews the preconfigured clearance request message that was received by radio contact with the pilot.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A method to generate a clearance request to deviate from a flight plan, the method comprising:

receiving at one or more processors in an airborne vehicle input from at least one automatic flight-plan-relevant source;

at least one of the one or more processors independently determining a revised flight route based on the received input;

at least one of the one or more processors independently generating a preconfigured clearance request message to deviate from the flight plan for a flight crew user based on the determining;

providing an audible prompt to the flight crew user for one of approval and rejection of the clearance request to deviate from the flight plan; and when an approval of the clearance request to deviate from the flight plan is received from the flight crew user, downlinking the preconfigured clearance request message.

2. The method of claim 1, further comprising:

uplinking one of an approval of the preconfigured clearance request message from a traffic controller and a rejection of the preconfigured clearance request message from the traffic controller.

3. The method of claim 1, wherein receiving input from at least one automatic flight-plan-relevant source comprises:

receiving at least one of a weather radar input, a ground proximity input, a traffic collision avoidance input, and flight data from a flight management computer (FMC).

4. The method of claim 1, wherein independently generating a preconfigured clearance request message for the flight crew user comprises:

independently generating a controller/pilot data link communication (CPDLC) clearance request.

5. The method of claim 1, wherein providing an audible prompt to the flight crew user comprises translating signals received from a controller/pilot data link communication (CPDLC) application into a string of phonemes that announce the clearance request to deviate from the flight plan using a voice readback device.

6. A system to automatically generate a clearance request to deviate from a flight plan of an airborne vehicle, the system comprising:

at least one interface on the airborne vehicle communicatively coupled to an associated automatic flight-plan-relevant source;

one or more processors on the airborne vehicle configured to receive input via the at least one interface, wherein at least one of the one or more processors is configured to use the input to independently determine if a revised flight route is to be created and indicated to a flight crew user, wherein at least one of the one or more processors is configured to generate a prompt for the flight crew user to one of approve and reject an independently generated clearance request to deviate from the flight plan when the revised flight route is to be created and indicated to the flight crew user;

an audio/aural interface unit on the airborne vehicle to audibly prompt to the flight crew user and to receive one of approval input or rejection input from the flight crew user; and a wireless interface to downlink the clearance request to deviate from the flight plan from the airborne vehicle to an air traffic controller at a ground control when the interface unit receives an approval input, the wireless interface further configured to uplink one of air traffic controller approval of the clearance request to deviate from the flight plan and air traffic controller rejection of the clearance request to deviate from the flight plan.

7. The system of claim 6, wherein the one or more processors comprise:

one or more predictive controller/pilot data link communication (CPDLC) clearance processors.

8. The system of claim 7, further comprising:

a controller/pilot data link communication (CPDLC) application to handle communications between the flight crew user and the air traffic controller, the CPDLC application communicatively coupled to at least one of the one or more predictive CPDLC clearance processors and the audio/aural interface unit.

9. The system of claim 8, further comprising:

a communications management unit including the wireless interface to link the CPDLC application to an air-to-ground wireless sub-network, the communications management unit communicatively coupled to the CPDLC application.

10. The system of claim 9, wherein the communications management unit comprises a router including the wireless interface.

11. The system of claim 8, wherein the audio/aural interface unit includes:

an audio alert generator to audibly provide the prompt to the user; and a user input interface communicatively coupled to the CPDLC application, the user input interface configured to receive the approval input and the rejection input from the flight crew user.

12. The system of claim 11, wherein the audio alert generator translates signals received from the CPDLC application into a string of phonemes.

13. The system of claim 12, further comprising:

a voice readback device that uses the string of phonemes to verbally announce the clearance request to deviate from the flight plan to the flight crew user.

14. The system of claim 11, wherein the user input interface is one of a tactile input interface and a tactile-audio interface.

15. The system of claim 11, wherein the user input interface is an audio input interface.

16. The system of claim 6, further comprising:

a non-transitory memory communicatively coupled to at least one of the one or more processors, the non-transitory memory storing a current flight plan in a non-transitory storage medium.

17. The system of claim 6, wherein one automatic flight-plan-relevant source comprises:

a flight management computer configured to output at least one of flight planning input, navigation data, and a combination thereof.

18. The system of claim 17, wherein the one or more processors are one or more predictive controller/pilot data link communication (CPDLC) clearance processors and wherein the flight management computer further includes a predictive controller/pilot data link communication (CPDLC) application communicatively coupled to at least one of the one or more CPDLC processors.

19. A system to automatically generate a clearance request to deviate from a flight plan, the system comprising:

means for automatically receiving input at an airborne vehicle, the input being related to conditions of a flight plan;

processing means on the airborne vehicle for independently generating a preconfigured clearance request message;

means for audibly indicating the preconfigured clearance request message to a flight crew user; and processing means for receiving two approvals to the independently generated preconfigured clearance request message at the airborne vehicle.

20. The system of claim 19, wherein the means to receive two approvals comprise:

means for receiving onboard approval input responsive to implementation of the means for audibly indicating the preconfigured clearance request message; and means for receiving an offboard approval input responsive to implementation of the means for receiving an onboard confirmation.

* * * * *